July 16, 1940.     C. S. NICOUD     2,208,339
PIPE
Filed March 18, 1940

INVENTOR
CORNELIUS S. NICOUD.
Elmer L. Zwickel
ATTORNEY

Patented July 16, 1940

2,208,339

UNITED STATES PATENT OFFICE 2,208,339

PIPE

Cornelius S. Nicoud, Chicago, Ill.

Application March 18, 1940, Serial No. 324,611

10 Claims. (Cl. 131—215)

The invention relates to improvements in pipes, and more particularly to a pipe embodying a novel arrangement of parts to facilitate cleaning and regulation of the draft therethrough.

An object of the invention is to provide a pipe having a valve therein embodying novel structural features.

Another object is to provide a pipe with means to facilitate easy and efficient regulation of the draft therethrough.

Another object is to provide a pipe with a valve embodying inexpensive structural features adapting it to be easily and quickly assembled, and which materially simplifies cleaning.

The foregoing and such other objects of the invention as will appear hereinafter as the description proceeds, will be more readily understood from a perusal of the following specification, in which reference is had to the accompanying drawing, wherein.

Figure 1:
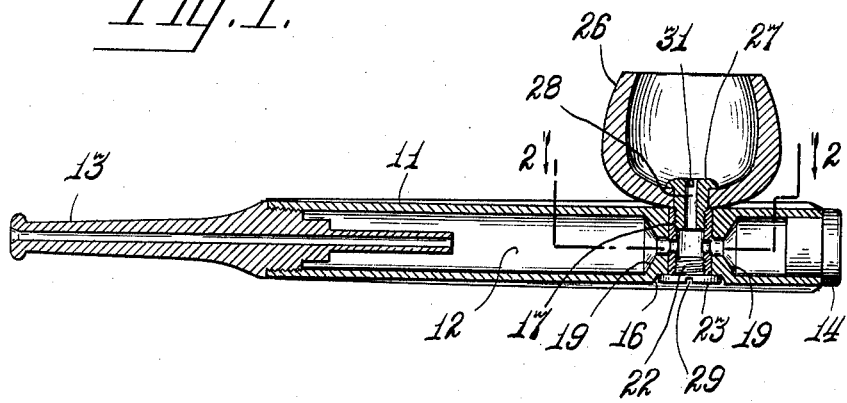
Fig. 1 is a longitudinal sectional view of the pipe.
Figure 2:
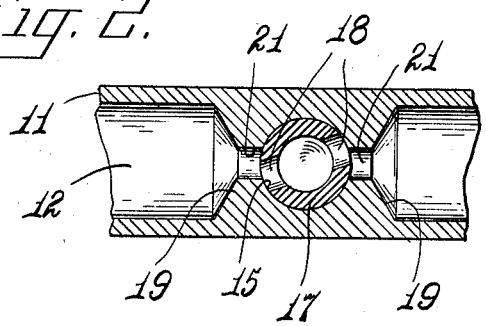
Fig. 2 is a horizontal sectional view taken on line 2—2 of Fig. 1.
Figure 3:
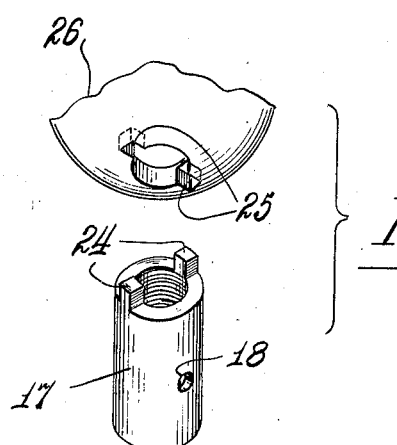
Fig. 3 is a disassembled perspective view of the valve sleeve and a fragment of the bowl.

Referring specifically to the drawing, the pipe includes a substantially long stem 11 having a longitudinal passage 12 therein. The stem preferably is made of metal but obviously, may be constructed of any other suitable material. One end of the longitudinal passage preferably is threaded to receive a mouth piece 13 and its other end is closed by a removable plug 14. A transverse opening 15 intersects the passage 12 and one end of said opening terminates in a recess 16 on one face of the stem.

A tubular body or sleeve 17 is fitted snugly into and is adapted to be rotated within the opening 15. As shown, the sleeve 17 has two ports 18 which are located to align with the passage 12 when the sleeve is in one of its positions of adjustment. These ports constitute one element of a valve structure and consequently the longitudinal passage 12 preferably is restricted adjacent the sleeve by providing two internal circumferential flanges 19 in said passage. In this manner, restricted openings 21 are provided in the passage 12 one on each side of the sleeve 17.

Withdrawal of the sleeve 17 from the transverse opening is prevented, in one direction, by a cap 22 which has its externally threaded body screwed into one internally threaded end of the sleeve. A flange 23 on said cap abuts the shoulder provided by the recess 16. The other end of the sleeve 17 is substantially flush with the respective face of the stem and has one or more lugs 24 thereon extending beyond said face. The lugs 24 are arranged to fit snugly into companion notches 25 provided on the bottom face of a tobacco bowl 26 when the latter is arranged in place.

An externally flanged nipple 27 extends through a central opening in the bottom of the bowl and is threaded into the internally threaded end of the sleeve 17 thereby securely joining the bowl and the sleeve to provide for their being rotated in unison. The passage 28 in said nipple, provides means to place the interior of the bowl in communication with the interior of the sleeve 17. If desired, screw driver slots 29—31 may be provided in the cap 22 and nipple 27, respectively, to facilitate assembly.

When assembled, as described, the area of the passageway through ports 18 and the associated openings 21 can be varied to suit the individual requirements of the user by turning the bowl (and the sleeve) into the required position. Also, when the ports 18 and openings 21 are aligned, the plug 14 may be removed and the stem blown or flushed to free it of nicotine or other waste matter.

Although an exemplary form of construction has been illustrated and described it is to be understood that the disclosure is illustrative rather than restrictive and that certain variations may be made in the detail structure without departing from the spirit of the invention or the scope of the appended claims.

I claim:

1. A pipe comprising, in combination, a stem having a longitudinal passage and a transverse opening intersecting said passage, a sleeve mounted in said transverse opening having a port connecting its interior with the longitudinal passage, means closing one end of said sleeve and preventing longitudinal movement of the sleeve in one direction, a bowl, and means to secure said bowl to the other end of said sleeve, said means having a passage communicating with the interior of said bowl and with the interior of said sleeve.

2. A pipe comprising, in combination, a stem having a longitudinal passage and a transverse opening intersecting said passage, a sleeve mounted in said transverse opening having a port connecting its interior with the longitudinal passage, a cap in one end of said sleeve to close said end and prevent longitudinal movement of the sleeve in one direction, a bowl, and a tubular fitting arranged to secure said bowl to the other end of said sleeve, said fitting providing a passage between the interior of said bowl and the interior of said sleeve.

3. A pipe comprising, in combination, a stem having a longitudinal passage and a transverse opening intersecting said passage, a removable plug closing one end of said longitudinal passage, a sleeve mounted in the transverse opening having a port connecting its interior with the longitudinal passage, means closing one end of said sleeve and preventing longitudinal movement of the sleeve in one direction, a bowl, and means to secure said bowl to the other end of said sleeve, said means being tubular to provide a passage between the interior of said bowl and the interior of said sleeve.

4. In a pipe, the combination of a stem having a longitudinal passage therein extending from end to end and a transverse passage intersecting said longitudinal passage adjacent one end, internal flanges in said longitudinal passage one on each side of said transverse passage, a bowl, a tubular member detachably secured to and communicating with the interior of said bowl, said member snuggly fitting into said transverse passage and having ports therein adapted to align with the restricted openings formed by said flanges to place the bowl in communication with the longitudinal passage.

5. In a pipe, the combination of a stem having a longitudinal passage therein and a transverse passage intersecting said longitudinal passage adjacent one end, said longitudinal passage being restricted on each side of said transverse passage, a bowl, and a tubular member attached to and communicating with the interior of said bowl, said member snuggly fitting into said transverse passage for rotation therein and being secured against removal to retain the bowl on the stem, the tubular member having ports therein arranged to place the bowl in communication with the longitudinal passage when said ports are in substantial alignment with the restricted area of said channel.

6. A pipe comprising, in combination, a stem having a longitudinal passage and a transverse opening intersecting said passage, a hollow valve body rotatable in said transverse opening having ports connecting its interior with the longitudinal passage, a bowl mounted on one end of said body, said bowl and body having co-acting elements to prevent independent rotation of either of said parts, and means to secure said bowl to said body, said means having a passage connecting the interior of the bowl with the interior of the valve body.

7. A pipe comprising, in combination, a stem having a longitudinal passage extending from end to end and a transverse opening intersecting said passage adjacent one end, a sleeve rotatable in said transverse opening having a port connecting its interior with the longitudinal passage, said sleeve being closed at one end, a bowl carried on the other end of said sleeve, said bowl and sleeve having co-acting elements to prevent independent rotation of either of said parts, and a tubular element securing said bowl to said sleeve and having a passage connecting the interior of said bowl with the interior of the sleeve.

8. A pipe comprising, in combination, a stem having a longitudinal passage and a transverse opening intersecting said passage, a sleeve rotatable in said transverse opening having a port connecting its interior with the longitudinal passage, said sleeve being closed at one end, a bowl carried on the other end of said sleeve, said bowl and sleeve having co-acting elements to prevent independent rotation of either of said parts, and a tubular element securing said bowl to said sleeve and having its passage connecting the interior of said bowl with the interior of the sleeve.

9. A pipe comprising, in combination, a stem having a longitudinal passage and a transverse opening intersecting said passage, a tubular valve body rotatable in said transverse opening having ports connecting its interior with the longitudinal passage, internal threads at each end of said valve body, a plug threaded into one end of said body, an external flange on said plug arranged to engage the stem to prevent withdrawal of the body in one direction, a bowl, a tubular fitting in said bowl threaded into the other end of said body to retain the bowl on said stem, and interlocking means in said bowl and said body to prevent independent rotation of either of said members.

10. A pipe comprising, in combination, a stem having a longitudinal passage and a transverse opening intersecting said passage, an internally threaded sleeve rotatable in said transverse opening having ports connecting its interior with the longitudinal passage, an externally flanged plug threaded into one end of said sleeve having its flange abutting the stem to prevent withdrawal of the sleeve in one direction, and a bowl detachably secured to the other end of said sleeve having its interior communicating with the interior of said sleeve, said bowl and sleeve being rotatable in unison to vary the area of said ports in communication with the longitudinal passageway.

CORNELIUS S. NICOUD.